United States Patent
Lagrange et al.

(10) Patent No.: US 10,135,690 B2
(45) Date of Patent: Nov. 20, 2018

(54) NODE DISCOVERY IN A COMMUNICATION NETWORK

(71) Applicant: CANON KABUSHIKI KAISHA, Tokyo (JP)

(72) Inventors: Pascal Lagrange, La Chapelle des Fougeretz (FR); Julien Sevin, Saint Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 14/534,101

(22) Filed: Nov. 5, 2014

(65) Prior Publication Data

US 2015/0131481 A1    May 14, 2015

(30) Foreign Application Priority Data

Nov. 7, 2013 (GB) .................................. 1319661.3

(51) Int. Cl.
*H04L 12/24* (2006.01)
*H04W 8/00* (2009.01)
*H04L 12/26* (2006.01)
*H04W 48/12* (2009.01)

(52) U.S. Cl.
CPC ............. *H04L 41/12* (2013.01); *H04W 8/005* (2013.01); *H04L 43/0847* (2013.01); *H04W 48/12* (2013.01)

(58) Field of Classification Search
CPC ....... H04W 48/16; H04W 4/18; H04W 8/005; H04W 48/128; H04W 48/12; H04L 43/0847; H04L 41/12
See application file for complete search history.

(56) References Cited

U.S. PATENT DOCUMENTS

| 6,728,540 | B1 * | 4/2004 | DeSantis | H04W 36/0061 455/436 |
| 2006/0084460 | A1 * | 4/2006 | Matsuo | H04W 52/146 455/522 |
| 2007/0058140 | A1 * | 3/2007 | Kobayashi | G03B 21/26 353/94 |
| 2008/0186907 | A1 * | 8/2008 | Yagyuu | H04B 7/155 370/328 |
| 2010/0027456 | A1 * | 2/2010 | Onggosanusi | H04B 7/024 370/312 |

(Continued)

*Primary Examiner* — Walter J Divito
*Assistant Examiner* — Anthony Luo
(74) *Attorney, Agent, or Firm* — Canon USA, Inc. I.P. Division

(57) ABSTRACT

There is provided methods for node discovery in a network comprising the following steps:
 performing a first discovery process for discovering at least one first node of said network, using at least one first wireless communication parameter,
 adapting said at least one first wireless communication parameter, thereby obtaining at least one second wireless communication parameter coordinated with wireless communication parameters of nodes of at least one group of nodes discovered during the first discovery process, and
 performing a second discovery process for discovering at least one second node of said network, using said at least one second wireless communication parameter.

Embodiments of the invention provide better coordination during node discovery thereby making the node discovery is thus made faster and reducing interferences between the nodes.

21 Claims, 13 Drawing Sheets

(56) References Cited

U.S. PATENT DOCUMENTS

| | | | |
|---|---|---|---|
| 2010/0027510 A1* | 2/2010 | Balasubramanian | ........................ H04W 48/18 370/332 |
| 2012/0057518 A1* | 3/2012 | Herrala | ................. H04W 84/20 370/315 |
| 2012/0275443 A1* | 11/2012 | Shpak | ................... H04W 76/02 370/338 |
| 2013/0083691 A1* | 4/2013 | Murphy | ................ H04W 12/06 370/254 |
| 2013/0265906 A1* | 10/2013 | Abraham | ............ H04W 40/246 370/254 |

* cited by examiner

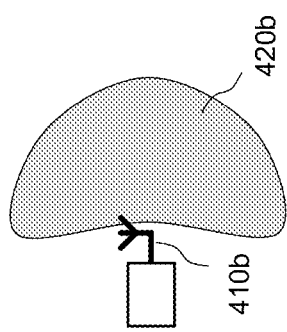
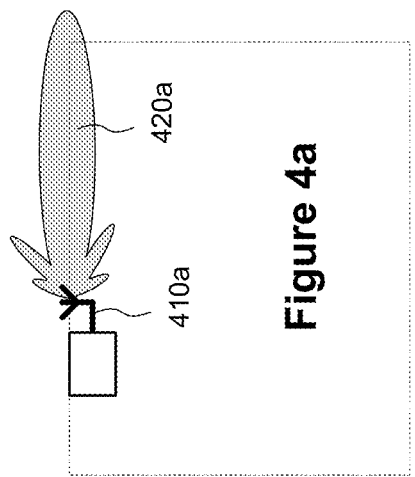
Figure 4a
Figure 4b

| Geometry device identifier | 1 | 2 | ... | j | ... | K |
|---|---|---|---|---|---|---|
| 1 | | | | | | |
| 2 | | | | | | |
| ... | | | | | | |
| j | | | | | | |
| ... | | | | | | |
| K | | | | | | |

Fig. 9

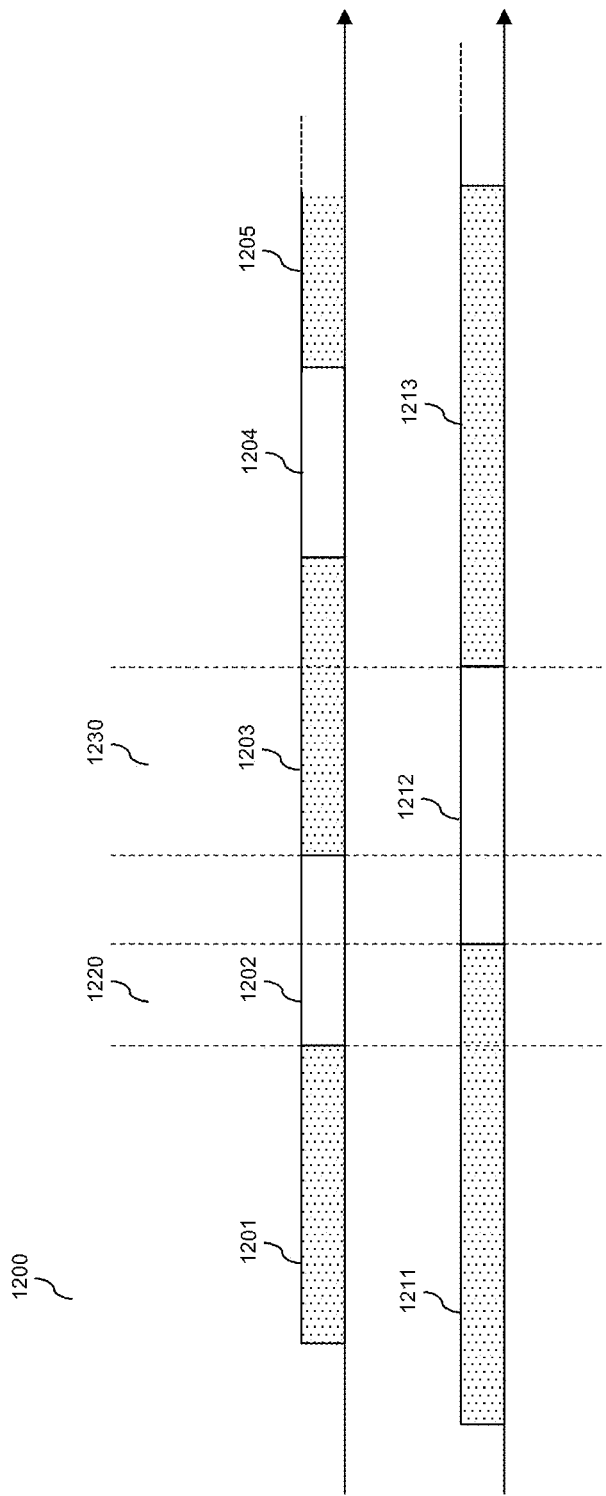

NODE DISCOVERY IN A COMMUNICATION NETWORK

CROSS-REFERENCE TO RELATED APPLICATIONS

The application claims the benefit under 35 U.S.C. § 119(a)-(d) of United Kingdom Patent Application No. 1319661.3, filed on Nov. 7, 2013 and titled "Node discover in a communication network." The above cited patent application is incorporated herein by reference in its entirety.

FIELD OF THE INVENTION

The present invention relates to node discovery methods in communication networks.

More particularly, the present invention relates to node discovery methods in wireless communication networks. The invention may have applications in ad-hoc wireless communication networks that rely on programmable antennas such as, for example, Wireless PAN (acronym for "Personal Area Network"), wireless multi-display networks, Wireless LAN (acronym for "Local Area Network") or the same. Such wireless networks may use 2.4 GHz, 5 GHz, 60 GHz radio bands or higher bands.

BACKGROUND OF THE INVENTION

In wireless communication networks, neighbour discovery may be performed by devices such as video projectors, laptops, mobile phones, digital tablets, or the like.

Wireless ad hoc networks comprise WPAN ("Wireless Personal Area Networks"), WLAN ("Wireless Local Area Networks"), WMAN ("Wireless Metropolitan Area Network"), WWAN ("Wireless Wide Area Networks"), wireless sensor networks etc. The number of applications based on this type of network is increasing. Applications may be video surveillance, video multi-projection, disaster recovery, etc.

Wireless ad hoc network schemes frequently rely on a mesh communication scheme, which allows collaborating devices to relay information from one device to another across multiple wireless links. Each device has the ability to operate in both transmit and receive modes, either simultaneously or alternately.

Typically, such wireless mesh networks are setup in a self-organizing way, which means that the network devices do not require a pre-existing infrastructure for performing device discovery along with medium access scheme determination and setup.

Some wireless ad-hoc mesh networks, even though being self-organizing, may have deterministic topologies. The devices remain static (for example a video surveillance network or a wireless sensor network installed in an office or a housing building). Such wireless networks may be of the IEEE 802.11 WPAN or WLAN type.

For example, disaster recovery networks are a type of wireless self-organizing networks. Such type of networks is deployed on wide terrains wherein wireless devices are assigned respective restricted operation areas that are arranged symmetrically and of equal sizes. Multi-projection systems, are another type of wireless self-organizing networks wherein spatial topology is typically setup according to an n×m matrix arrangement.

Some wireless networks, even though being "ad-hoc" in the sense that their actual spatial arrangement is not predetermined, may nevertheless be setup according to some predefined network model settings. In other words, even though their actual spatial topology is not known by the network devices, such devices may intuit it at some point. For example, in case the devices are spatially arranged according to an array topology, each device knows that it is surrounded by up to eight other devices. Each device may thus intuit the positioning of its potential neighbour devices. In the same way, a video projector device belonging to a matrix of video projectors may not know the actual size of the matrix. In case the only communications allowed in the network are communications between devices belonging to the same line or column, a device knows that its potential neighbour devices are located at 0°, 90°, 180° and 270° directions.

In a wireless self-organizing network, one given device may be able to communicate only with a limited set of devices. Such devices are commonly referred to as "neighbour devices". In the absence of a master coordinator device, at least upon system start up, each device shall first discover its own neighbour devices before any medium access scheme and associated routing is set up. The process for a device to identify all its neighbours is usually referred to as "neighbour discovery process".

Typically, a device that wishes to discover its neighbour devices shall transmit, in broadcast mode in most cases, a probe message and wait for the reception of a probe response message issued by a neighbour device (which has received the probe message). Such probe handshake shall be robust to frame collisions and interferences, which are most likely to occur in an ad-hoc wireless network. Indeed, the interferences and collisions during the "neighbour discovery process" make the process last longer. In order to mitigate the impact of frame collisions and network interferences, probe messages and response frames to/from different neighbours are typically generated repeatedly and transmitted after random delays.

This neighbour discovery approach, also referred to as the "random access neighbour discovery scheme", has been specified for the ad-hoc mode of IEEE 802.11 standards as well as for generic mobile ad hoc networks ("MANETs") by the Internet Engineering Task Force ("IETF") MANET working group, and is found in many well-known state of the art algorithms, like for instance the "birthday" algorithm or the "coupon collector" algorithm. These algorithms rely on a collision model while requiring the devices to randomly alternate transmit and receive modes, so as to ensure the completion of the handshake discovery process. However, such discovery schemes require a significant amount of contention time slots to guarantee successful discovery, which results in a significant latency before discovery process completion, along with significant bandwidth overhead.

Document WO 2012/131512 A1 discloses a group-based discovery scheme for reducing the risks of interferences and frame collisions during the neighbour discovery process.

The group-based discovery scheme is based on the dynamic and iterative selection of a neighbour discovery proxy, amongst a reference group of network devices, by a centralized coordinator device. The selected proxy device is in charge of both performing discovery process handshake(s) with its neighbour device(s) and reporting the results of this discovery process to the centralized coordinator device. Said centralized coordinator device shall then associate the newly discovered neighbour devices to the reference group of network devices and select a new proxy device inside the reference group until a predefined number of devices were discovered.

Such method requires a network device to be selected for acting as a centralized coordinator device in charge of driving the discovery process. This may considered as in contradiction with the self-organizing network approach.

Moreover, such method implies that only one device at a time is performing neighbour discovery, which may increase the overall discovery process latency.

Thus, there is a need for enhancing neighbour device discovery is wireless communication networks.

The present invention lies within this context.

SUMMARY OF THE INVENTION

According to a first aspect of the invention there is provided a method of node discovery in a network comprising the following steps:
performing a first discovery process for discovering at least one first node of said network, using at least one first wireless communication parameter,
adapting said at least one first wireless communication parameter, thereby obtaining at least one second wireless communication parameter coordinated with wireless communication parameters of nodes of at least one group of nodes discovered during the first discovery process, and
performing a second discovery process for discovering at least one second node of said network, using said at least one second wireless communication parameter.

According to embodiments, nodes that discovered each other are aggregated into groups of nodes. This makes it possible to reduce network interferences resulting from several devices performing simultaneously discovery process.

The node discovery is coordinated between the nodes of the network. The overall node discovery is thus made faster.

Coordination of the wireless communication parameters makes it possible to reduce interferences between the nodes during the discovery. This also makes it possible to avoid redundant discoveries.

The discovery space where to search for nodes may thus be shared between the nodes that already discovered each other. Each node may discover other nodes in a respective and dedicated direction, according to the coordinated parameters.

According to embodiments, the method further comprises a step of evaluating a spatial topology of said at least one group of nodes, and wherein said at least one first wireless parameter is adapted based on said evaluated topology.

For example, the method further comprises transmitting said evaluated spatial topology to at least one node of said at least one group.

According to embodiments, said spatial topology is evaluated at least based on a topology message received from at least one node of said group.

For example, said topology message comprises information relating to a spatial topology of a group of nodes to which it formerly belonged.

For example, evaluating said spatial topology comprises updating a spatial topology array representative of a current spatial topology of said group of nodes.

According to embodiments, said spatial topology array is further representative of communication paths between nodes of the group of nodes.

According to embodiments:
said wireless communication parameters comprise at least one antenna parameter, and
said adaptation step is performed in view of performing said second discovery process according to a respective discovery direction corresponding to a subdivision of a node discovery space.

For example, said node discovery space is subdivided into discovery directions and each node of said group of nodes performs a respective discovery process according to a respective discovery direction.

For example, said subdivision is an angular subdivision.

According to embodiments:
said performing of a first discovery process comprises emitting a probe message and receiving, from at least one node of said at least one group of nodes, a discovery message in response to said probe message, and
the method further comprises transmitting, to said at least one node of the network, a confirmation message.

According to a second aspect of the invention, there is provided a method of image data projection, by a multi-projection system, comprising the following steps:
discovering projection nodes of a network of the multi-projection system, according to the first aspect,
subdividing at least one image according to projection nodes discovered, and
projecting respective image subdivisions by said projection nodes discovered.

According to a third aspect of the invention, there are provided computer programs and computer program products comprising instructions for implementing methods according to the first and/or second aspect(s) of the invention, when loaded and executed on computer means of a programmable apparatus.

According to a fourth aspect of the invention, there is provided a node device configured for implementing methods according to the first aspect.

Such device may comprise a processing unit configured to perform a first discovery process for discovering at least one first node of said network, using at least one first wireless communication parameter, to adapt said at least one first wireless communication parameter, thereby obtaining at least one second wireless communication parameter coordinated with wireless communication parameters of nodes of at least one group of nodes discovered during the first discovery process, and to perform a second discovery process for discovering at least one second node of said network, using said at least one second wireless communication parameter.

The processing unit may be further configured to evaluate a spatial topology of said at least one group of nodes, and wherein said at least one first wireless parameter is adapted based on said evaluated topology.

For example, said processing unit is further configured to transmit said evaluated spatial topology to at least one node of said at least one group.

For example, said spatial topology is evaluated at least based on a topology message received from at least one node of said group.

For example, said topology message comprises information relating to a spatial topology of a group of nodes to which it formerly belonged.

For example, evaluating said spatial topology comprises updating a spatial topology array representative of a current spatial topology of said group of nodes.

For example, said spatial topology array is further representative of communication paths between nodes of the group of nodes.

According to embodiments:
said wireless communication parameters comprise at least one antenna parameter, and
said adaptation is performed in view of performing said second discovery process according to a respective discovery direction corresponding to a subdivision of a node discovery space.

For example, said node discovery space is subdivided into discovery directions and each node of said group of nodes performs a respective discovery process according to a respective discovery direction.

For example, said subdivision is an angular subdivision.

According to embodiments:
said performing of a first discovery process comprises emitting a probe message and receiving, from at least one node of said at least one group of nodes, a discovery message in response to said probe message, and
the processing unit is further configured to transmit, to said at least one node of the network, a confirmation message.

According to a fifth aspect of the invention, there is provided a system comprising at least one node device according to the fourth aspect.

For example, the system is a multi-projection system, for projection of image data, comprising a plurality of projection nodes according to the fourth aspect, wherein said projection nodes are further configured to subdivide at least one image according to projection nodes discovered, and wherein the projection nodes discovered are further configured to project respective image subdivisions.

The objects according to the second, third, fourth and fifth aspects of the invention provide at least the same advantages as those provided by the method according the first aspect of the invention.

BRIEF DESCRIPTION OF THE DRAWINGS

Other features and advantages of the invention will become apparent from the following description of non-limiting exemplary embodiments, with reference to the appended drawings, in which:

FIGS. 4a and 4b schematically illustrate exemplary radio beams of antennas;

FIG. 9 illustrates an exemplary topology array for describing a network topology;

FIG. 12 illustrates an exemplary wireless medium access scheme according to embodiments;

DETAILED DESCRIPTION OF THE INVENTION

Figure 1:
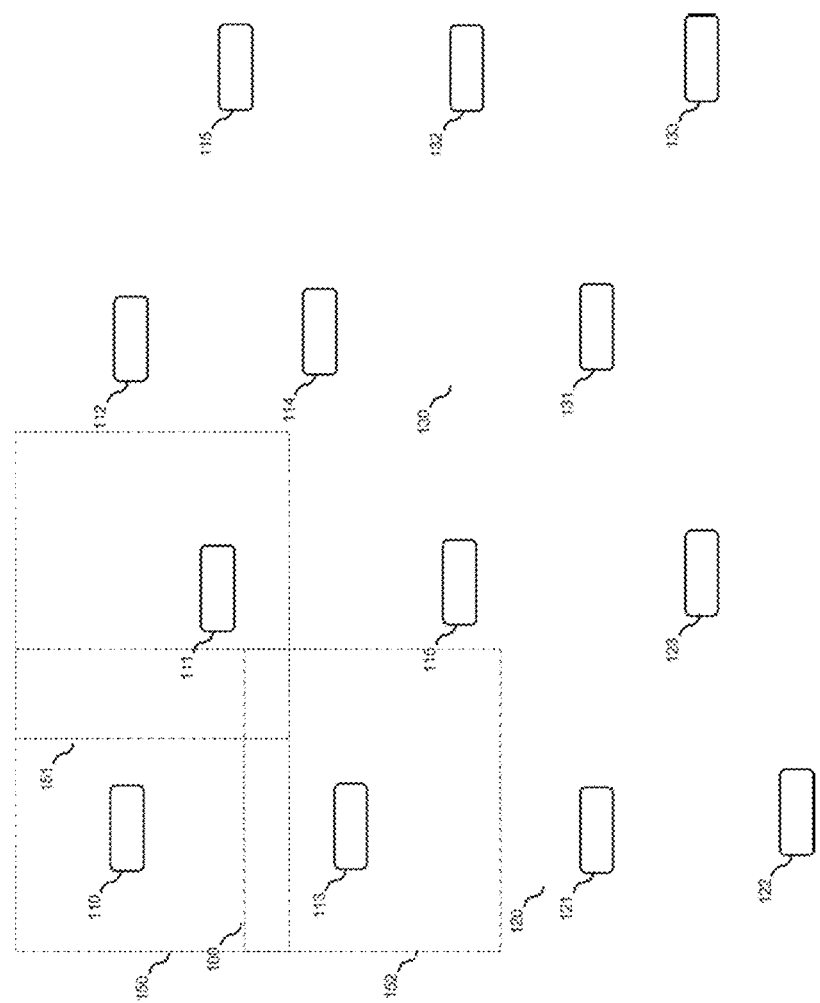
FIGS. 1-2 are schematic illustrations of exemplary communication networks.
Figure 2:
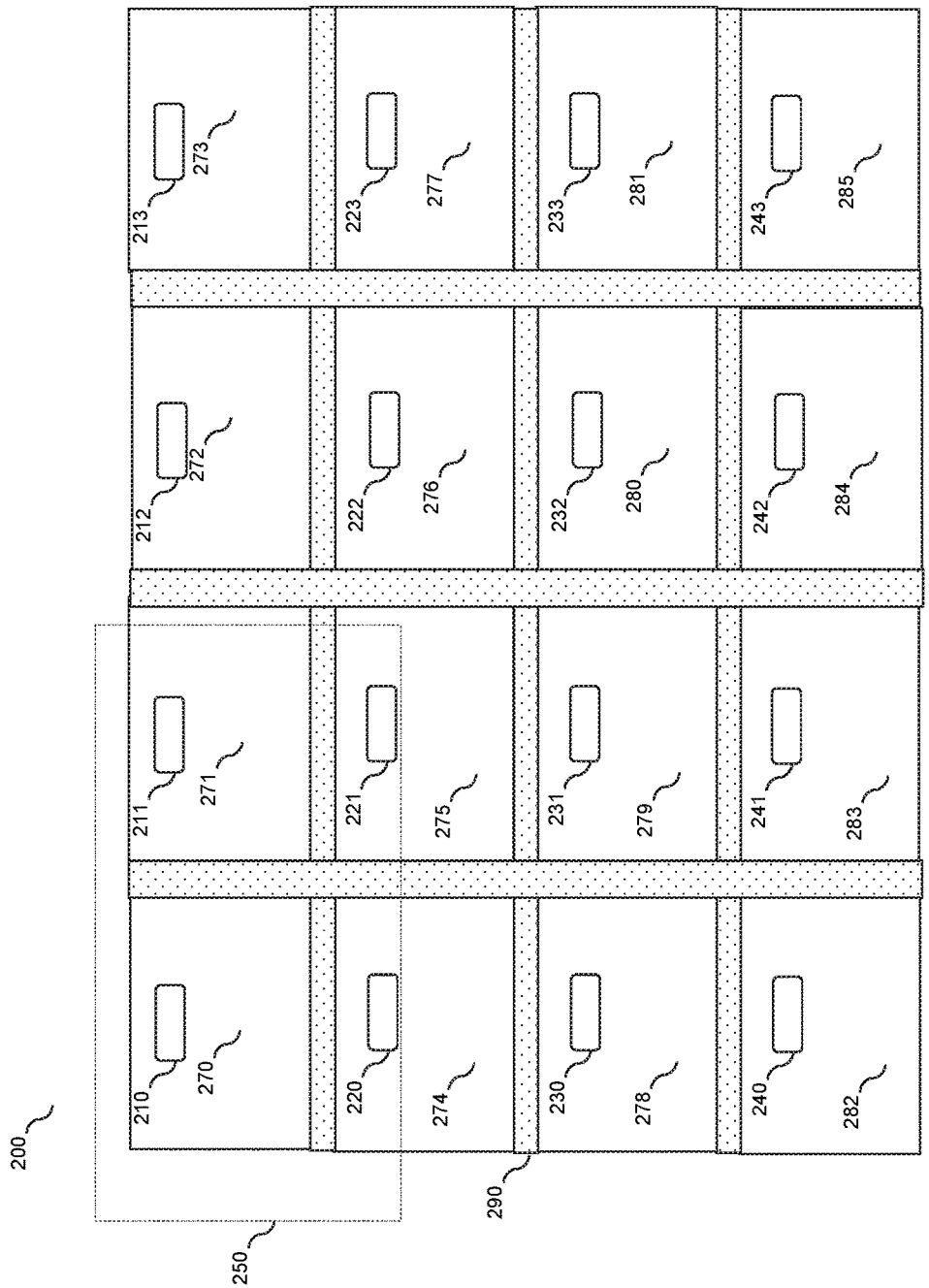

With reference to FIG. 1 and FIG. 2 illustrative wireless self-configuring networks are described.

FIG. 1 is a schematic illustration of a wireless self-configuring network 100 comprising a plurality of nodes 110, 111, 112, 113, 114, 115, 116, 121, 122, 123, 130, 131, 132, 133, 140, 141, 142 and 143. For example, the network is designed to resist a disaster scenario. For example, the network nodes comprise wireless sensors, mobile phones, or any other device that may be typically found in a wireless ad hoc network, like for instance IEEE 802.11 WPAN or WLAN or 802.15.4 wireless sensor networks. Each of these network nodes 110, 111, 112, 113, 114, 115, 116, 121, 122, 123, 130, 131, 132, 133, 140, 141, 142 and 143 is assigned a geographic area, like for instance areas 150, 151 and 152. Each of these network nodes embeds at least one communication module, which includes at least one antenna (the communication modules are described hereinafter in more details with reference to FIG. 4).

FIG. 2 is another schematic illustration of a wireless self-configuring network 200 comprising a plurality of nodes 210, 211, 212, 213, 220, 221, 222, 223, 230, 231, 232, 233, 240, 241, 242 and 243. For example, the network is designed for a cubicle office environment. Cubicles 270, 271, 272, 273, 274, 275, 276, 277, 278, 279, 280, 281, 282, 283, 284 and 285 are typically rooms in an office or housing building. Each cubicle has a typical dimension ranging from 3 m×3 m up to 5 m×5 m. The cubicles are separated by a light office or wall partition wall, like for instance partition 290, characterized by a penetration loss, which typical value is 2 dB.

The network nodes are typically computers, laptops, video surveillance cameras, wireless sensors or any other devices that may be typically found in a wireless ad hoc network, like for instance IEEE 802.11 WPAN or WLAN or 802.15.4 wireless sensor networks. Each of these network nodes 210, 211, 212, 213, 220, 221, 222, 223, 230, 231, 232, 233, 240, 241, 242 and 243 embeds at least one communication module, which includes at least one antenna (the communication modules are described hereinafter in more details with reference to FIG. 4).

According to exemplary embodiments, communication networks 100 and 200 are full wireless communication networks. Thus, all the communication links may be wireless. The wireless communication networks may be operated in one or several of the 5 GHz unlicensed spectrum, the 2.4 GHz unlicensed spectrum, the 57-66 GHz millimeter-wave unlicensed spectrum, or higher frequency bands (e.g. THz bands).

Figure 3:
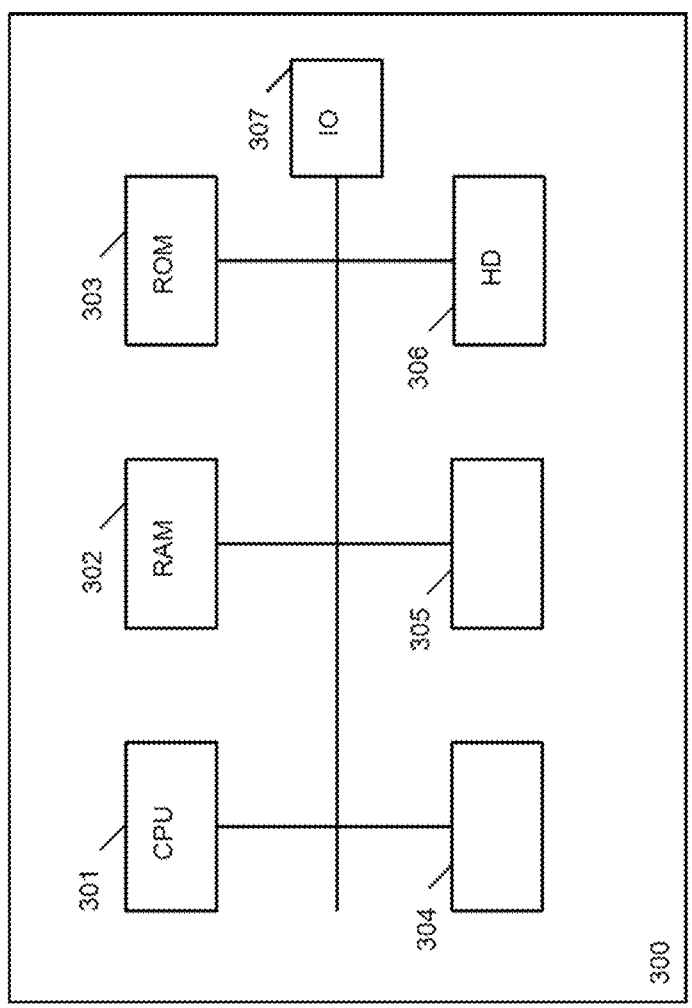
FIG. 3 is a schematic illustration of a node according to embodiments.

FIG. 3 is a schematic block diagram of an exemplary communication device 300 configured for performing a node discovery method according to embodiments. The device may be a video projector, a micro-computer, a workstation, a light portable device or any other type of network node. The device comprises a communication bus connected to:
  a central processing unit 301 (CPU);
  a random access memory 302 (RAM for "random access memory"), for storing the executable code of a computer program according to embodiments as well as the registers adapted to record variables and parameters for the execution of such code; the memory capacity thereof can be expanded by an optional RAM connected to an expansion port for example;

a read only memory 303 (ROM for "read only memory"), for storing computer programs for implementing a method according to embodiments or input data for such implementation;

a network interface 304 connected to a communication network over which digital data to be processed are transmitted or received. The network interface 304 can be a single network interface, or comprise a set of network interfaces (for instance wired and wireless interfaces, or different kinds of wired or wireless interfaces). The wireless interface comprises antennas (as described hereinafter with reference to FIG. 4). Data packets are written to the network interface for transmission or are read from the network interface for reception under the control of the software application running in the CPU;

a user interface 305 for receiving inputs from a user or to display information to a user;

a hard disk 306 (HD); and an I/O module 307 for receiving/sending data from/to external devices such as a video source or display.

The executable code may be stored either in the ROM, in the hard disk or on a removable digital medium such as for example a disk. The executable code of the programs may also be received by means of a communication network, via the network interface, in order to be stored in one of the storage means of the device, such as the hard disk, before being executed.

The CPU is configured to control and direct the execution of the instructions or portions of software code of the program or programs according to embodiments. The instructions are stored in one of the aforementioned storage means. The CPU is configured to execute instructions from the main RAM relating to a software application after the instructions have been loaded from the program ROM or the hard-disc for example. Any steps of the algorithms described hereinafter, with reference to FIG. 7, FIG. 8 and FIG. 11 may be implemented by software by execution of a set of instructions or program by a programmable computing machine, such as a PC ("Personal Computer"), a DSP ("Digital Signal Processor") or a microcontroller; or else implemented by hardware by a machine or a dedicated component, such as an FPGA ("Field-Programmable Gate Array") or an ASIC ("Application-Specific Integrated Circuit").

With reference to FIGS. 4a and 4b, exemplary antenna modules are described. The antenna modules may be integrated to communication modules of nodes of communication networks such as networks 100 and 200 described hereinabove with reference to FIGS. 1 and 2.

The antenna 410a in FIG. 4a has a single narrow main beam 420a. The antenna 410b in FIG. 4b has a single wide main beam 420b.

For each antenna, two modes may be defined: a directional mode and a wide mode. Each mode is used for transmitting and receiving discovery protocol messages, as described in what follows with reference to FIGS. 10a, 10b and FIG. 11, in order to perform neighbour device discovery according to algorithms as described in what follows with reference to FIG. 7 and FIG. 8.

In the directional mode, the antenna focuses transmit and/or receive power towards one direction. Steering an antenna to a given direction (or orientation) corresponds to controlling its parameters (for example the weighting coefficients associated with the elements of an antenna array) such that the radiation pattern, in case of emission, or the antenna sensitivity pattern, in case of reception, is accentuated in that given direction relatively to other directions.

In FIG. 4a, the antenna 410a transmits a signal via the single narrow main beam 420a. For example, the antenna's gain at a 5° angle is −3 dBi from the maximum, where "dBi" represents a measure of antenna gain relatively to an isotropic antenna. The antenna's main beam gain is relatively high, for example 25 dBi. The antenna has thus different gain characteristics at different reception angles. A maximum gain is obtained in the direction of the main beam.

Alternatively, in wide mode, an antenna performs a transmission towards or reception from a plurality of transmission paths which can be affected simultaneously (covering simultaneously a plurality of directions). In FIG. 4b the antenna 410b has a single 210° wide main beam 420b. The main beam gain is thus relatively small, approximately 4 dBi. A wide beam or near omni-directional antenna can be implemented as a single dedicated antenna element. Alternatively, an antenna array comprising a plurality of antenna elements dedicated to directional transmission can be reused by activating a single antenna element among the array of antenna elements.

It may not be possible to cover all the directions even with a single antenna in wide mode. Therefore, complementary antennas may be used in the same device, each one covering areas in different directions. For instance, in the case wherein a device has 2 antennas, the first antenna may cover the area defined by the angular directions between 0 and 180 degrees and a second antenna may cover the area defined by the angular directions between 181 and 360 degrees. Consequently, when a device has to send a message towards a given direction, it selects the antenna which covers it.

For the sake of conciseness, it may be considered that the antennas of a same device are either all in wide or all in directional mode. Consequently, when the antennas of a device are all in wide mode, the device is considered as being "in omnidirectional antenna mode" (since the antennas of such device are complementary). Also, when the antennas of a device are all in directional mode, the device is considered as being "in directional antenna mode".

A given antenna is either transmitting—i.e. ready to send data—or receiving—i.e. ready to receive data. For the sake of conciseness, the antennas of a device are either all in transmission mode or all in reception mode. Consequently, when the antennas of a device are all in transmission mode (respectively in reception mode), the device is considered as "in transmission mode" (respectively "in reception mode").

Consequently, four antenna modes can be considered for a given device (or network node):

Emission/Wide: the device is in transmission mode and in wide antenna mode;

Emission/Directional: the device is in transmission mode and in directional antenna mode;

Reception/Wide: the device is in reception mode and in wide antenna mode; and

Reception/Directional: the device is in reception mode and in directional antenna mode.

Figure 5:
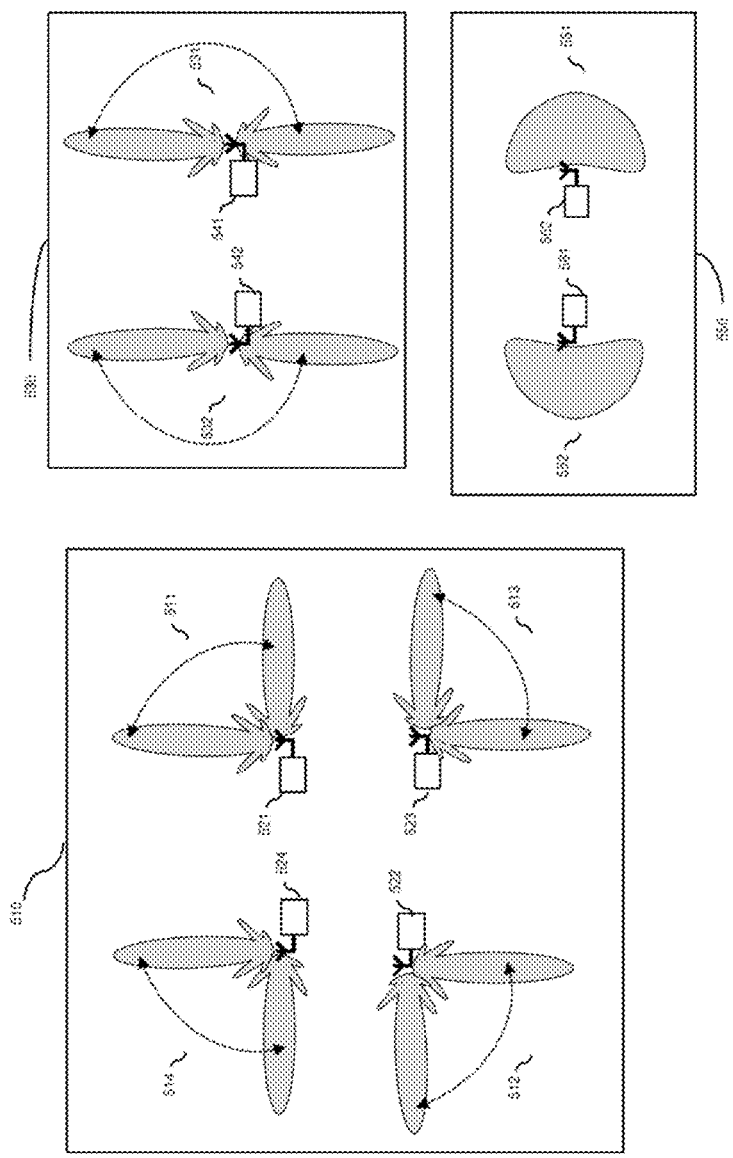
FIG. 5 illustrate exemplary complementary radio settings.

With reference to FIG. 5, exemplary complementary (or coordinated) radio and antenna settings that may be applied by one or more devices are described.

Radio and antenna communication scheme 510 involves four communication modules 521, 522, 523 and 524 (as described hereinabove with reference to FIG. 4) operated in directional mode.

The antenna of communication module 521 performs antenna sweep according to antenna settings 511, which specify an angular range of operation between 0° and 90°.

The antenna of communication module 522 performs antenna sweep according to antenna settings 512, which specify an angular range of operation between 180° and 270°.

The antenna of communication module 523 performs antenna sweep according to antenna setting 513, which specify an angular range of operation between 270° and 0°.

The antenna of communication module 524 performs antenna sweep according to antenna setting 514, which specify an angular range of operation between 90° and 180°.

The antenna settings 511, 512, 513 and 514 of communication modules 521, 522, 523 and 524 are complementary (or coordinated) in the sense that they cover the full angular space, ranging from 0° to 360°, when they are all used in emission or in reception mode.

Radio and antenna communication scheme 530 involves two communication modules 541 and 542 (as described hereinabove with reference to FIG. 4) operated in directional mode.

The antenna of communication module 541 performs antenna sweep according to antenna setting 531, which specifies an angular range of operation between 270° and 90°.

In one embodiment of the present invention, antenna setting 532 is alternately used in reception mode while antenna setting 531 is used in transmission mode or in transmission mode while antenna setting 531 is used in reception mode.

The antenna of communication module 542 performs antenna sweep according to antenna settings 532, which specify an angular range of operation between 90° and 270°.

The antenna settings 531 and 532 of communication modules 541 and 542 are complementary (or coordinated) in the sense that they cover the full angular space, ranging from 0° to 360°, when they are both used in emission or in reception mode.

Radio and antenna communication scheme 550 involves two communication modules 561 and 562 (as described hereinabove with reference to FIG. 4) operated in wide mode.

The antenna of communication module 551 covers space between 270° and 90°. The antenna of communication module 552 covers space between 90° and 270°. The antenna settings 551 and 552 of communication modules 561 and 562 are complementary (or coordinated) in the sense that they cover the full angular space, ranging from 0° to 360°, when they are both used in emission or in reception mode.

Using complementary (or coordinated) antenna settings scheme 510 in a group of four network devices (like for instance group 1370 described hereinafter with reference to FIG. 13) makes it possible to perform a fast discovery process since each network device belonging to this group limits its antenna discovery space to 90°. Such antenna setting scheme also makes it possible to have the four nodes of group 1370 described hereinafter with reference to FIG. 13 to perform simultaneously their antenna discovery process while avoiding any interference between each other, thereby increasing the efficiency of the discovery process.

Figure 6:
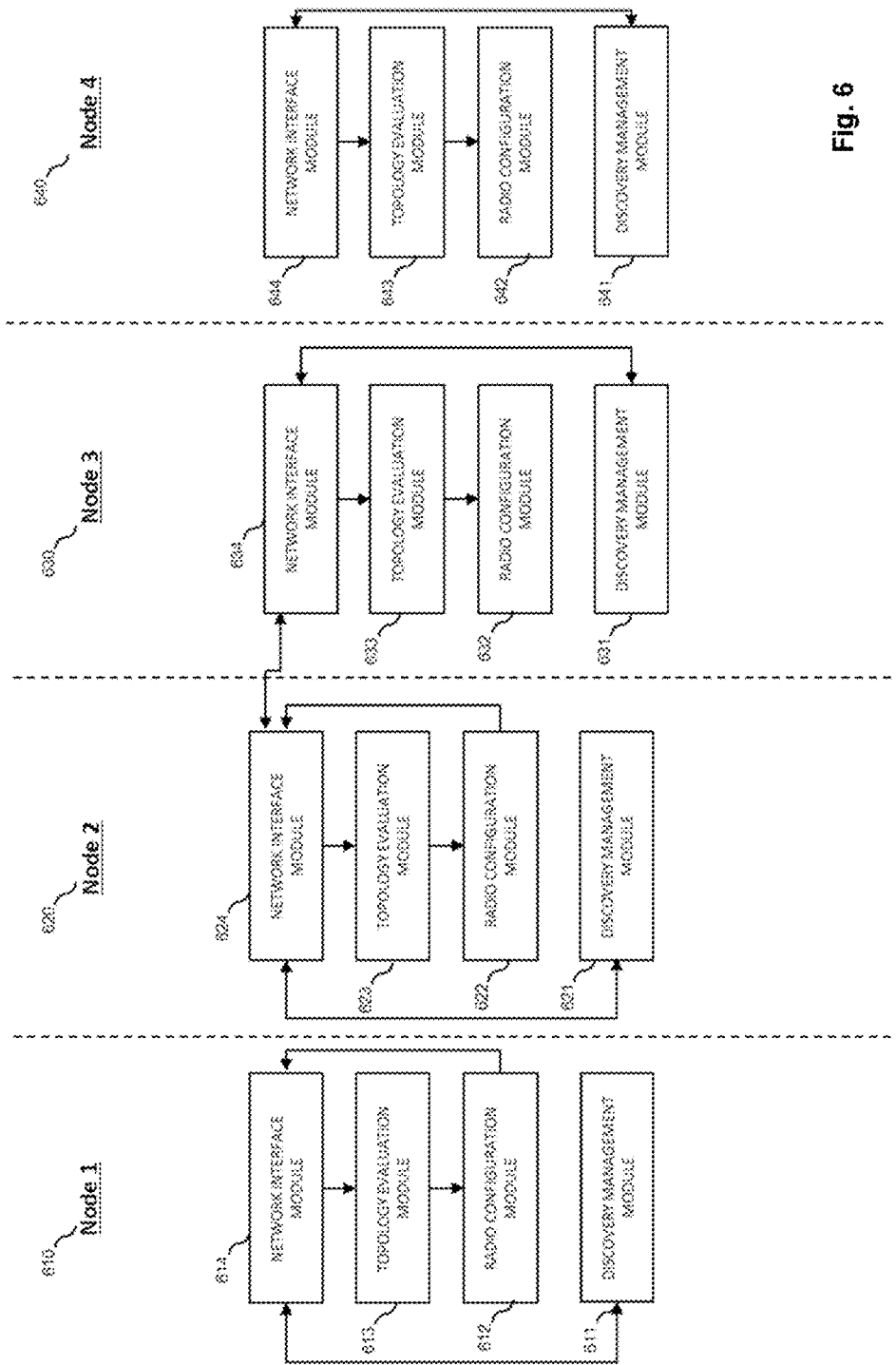
FIG. 6 illustrates an exemplary software architecture for nodes according to embodiments.

An exemplary software architecture of a network node is described with reference to FIG. 6.

Discovery Management modules 611, 621, 631 and 641 of network devices 610, 620, 630 and 640 are configured to determine which discovery messages are to be sent over network interface modules 614, 624, 634 and 644. The discovery messages comprise probe, feedback and Confirmation Messages. These messages are described in details hereinafter with reference to FIGS. 10a, 10b and FIG. 11. The sequencing of these discovery messages may be performed in accordance with the algorithm described in what follows with reference to FIG. 7.

Upon receipt of a feedback discovery message by a network interface module, the topology evaluation module (cf. modules 613, 623, 633 and 643) updates the topology of the group of devices to which it belongs, by including the newly discovered network device that issued the feedback discovery message (as described hereinafter with reference to FIG. 8). Based on the newly computed group topology, the radio configuration module (cf. modules 612, 622, 632 and 642) determines the radio and antenna settings to be used by each network interface module for transmitting and receiving discovery messages, in accordance with the algorithm described hereinafter with reference to FIG. 8.

Figure 7:
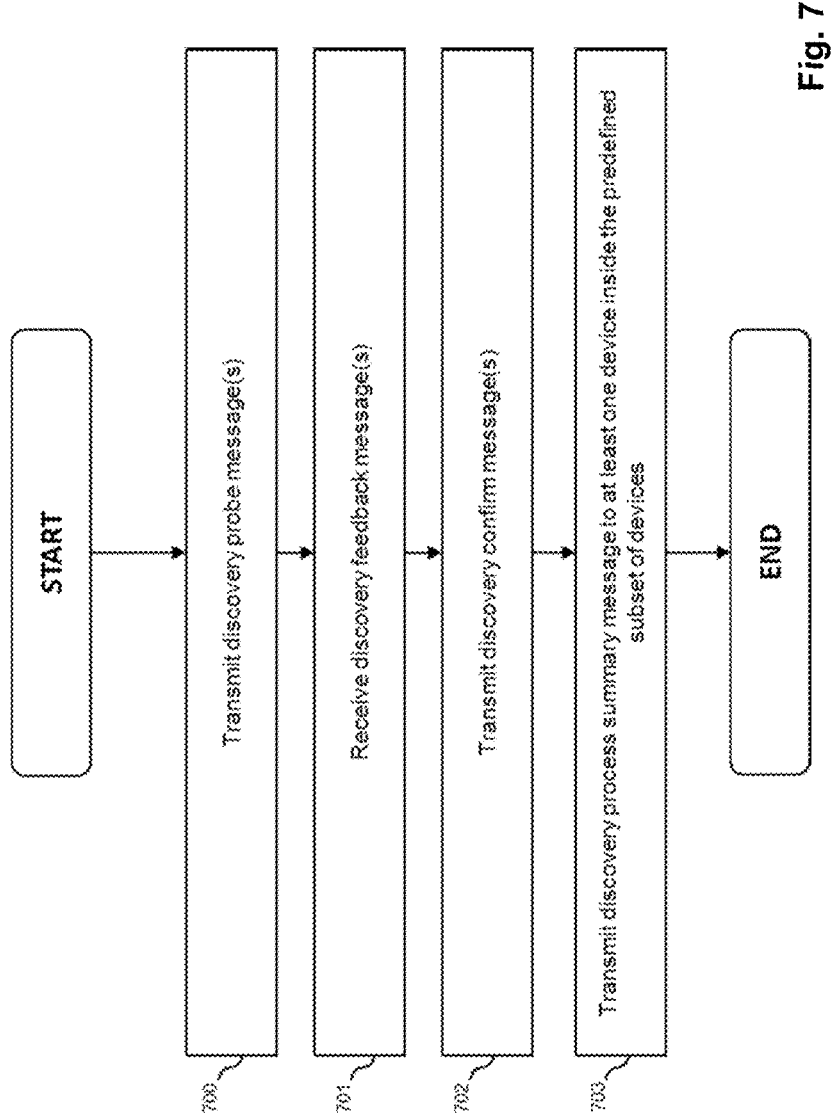
FIGS. 7-8 are flowcharts of steps of methods according to embodiments.

FIG. 7 is a flowchart of steps of a method for performing a neighbour discovery according to embodiments. With reference to FIG. 7, the method is described at a device level.

The algorithm may be implemented by a discovery management module as described hereinabove with reference to FIG. 6.

In a first step 700, a network device transmits, through its network interface module, a probe message using radio and antenna settings formerly determined by its radio configuration module. The format of the probe messages is described in what follows with reference to FIG. 10a. The probe messages may be transmitted during each of the device's transmission periods, in accordance with a medium access scheme. An exemplary medium access scheme is described in what follows with reference to FIG. 12.

The network interface uses the radio and antenna settings defined by the radio configuration module. The determination of these radio and antenna settings as performed by the radio configuration module is described in what follows with reference to FIG. 8.

Next, during a step 701, the network device waits for the receipt of a discovery message issued by a neighbour device, which received a probe message sent by the network device during step 700. The format of such feedback message is described hereinafter with reference FIG. 10b. A network device shall probe the wireless medium during each of its reception periods, in accordance with the medium access scheme described with reference to FIG. 12.

The information embedded in the feedback message is passed by the network interface module to the topology evaluation module. The topology evaluation module then evaluates the new topology of the group to which the network device belongs so as to allow the radio configuration module to define new radio and antenna settings for transmitting and receiving discovery messages.

During a step 702, the network device transmits, through its network interface module, a confirmation message using radio and antenna settings formerly determined by the radio configuration module. The format of the discovery confirmation message is described in what follows with reference to FIG. 11.

Finally, during a step 703, the network device transmits, through its network interface module, a discovery process summary message 1150 (which is described in more details hereinafter with reference to FIG. 11b), to at least one another network device belonging to its current group of devices. For example, the network device transmits, through its network interface module, a discovery process summary message 1150 to all the network devices inside its current group of devices. The network device may also relay, through its network interface module, any discovery process summary message to at least one of the network devices of its current group of devices, so as to ensure that all the devices inside a group of devices share the same knowledge of the discovery process performed by each of the network devices belonging to the group of devices.

The discovery process summary messages 1150 are used by the topology evaluation modules to evaluate the new topology of the group to which the network device belongs.

An application of the process described with reference to FIG. 7 is presented hereinafter in the context of an exemplary network 1300 represented in FIG. 13.

The network 1300 comprises three groups of devices 1350, 1360 and 1370. Group 1350 comprises network devices 1311 and 1312. It is considered that network devices 1311 and 1312 already discovered each other by applying the process of FIG. 7 (and also the process described hereinafter with reference to FIG. 8). Group 1370 comprises network devices 1331, 1332, 1341 and 1342. It is considered that network devices 1331, 1332, 1341 and 1342 already discovered each other by applying the algorithms of FIG. 7 (and also the process described hereinafter with reference to FIG. 8). Group 1360 comprises a single network device 1322. It is considered that network device 1360 has not discovered any other device yet. This may be due to the fact that network device 1360 was turned on after network devices 1311, 1312, 1331, 1332, 1341 and 1342.

The network devices belonging to groups 1350, 1360 and 1370 shall transmit either discovery probe messages 1000 or discovery confirmation messages 1100 during their transmission periods. The devices shall also probe the wireless medium so as to receive discovery feedback messages 1050 during their transmission periods. The medium access scheme is described hereinafter with reference to FIG. 12. Each time a discovery confirmation message 1100 is sent by a device belonging to any one of these groups of devices, such device shall send a discovery process summary message 1150 to the other network devices belonging to the same group, if any. The network devices belonging to a same group of device shall use dedicated communication links to exchange the discovery process summary messages. For instance, network devices 1311 and 1312 that belong to group 1350, use on network communication link 1351 for exchanging their discovery process summary messages 1150. Network devices 1331, 1332, 1341 and 1342 that belong to group 1370, use network communication links 1371, 1372, 1373 and 1374 for exchanging their discovery process summary messages. For example, communication links 1351, 1371, 1372, 1373 and 1374 are operated in accordance with the medium access scheme described with reference to FIG. 12.

The transmission period for one device transmitting data over such communication links corresponds to a reception period of the network device receiving data over such communication link.

For instance, if network device 1312 receives a discovery feedback message 1050 in response to a previously sent discovery probe message 1000, from network device 1322, it shall send a discovery process summary message to network device 1311.

For instance, if network device 1332 receives a discovery feedback message 1050 in response to a previously sent discovery probe message 1000, from network device 1322, it shall send a discovery process summary message 1150 to at least one other network device belonging to group 1370, using communication links 1371 and/or 1372. The discovery process summary message 1150, issued by network device 1332, may be relayed by at least one of network devices 1331 and 1342 to network device 1341 using communication links 1373 and 1374.

Figure 8:
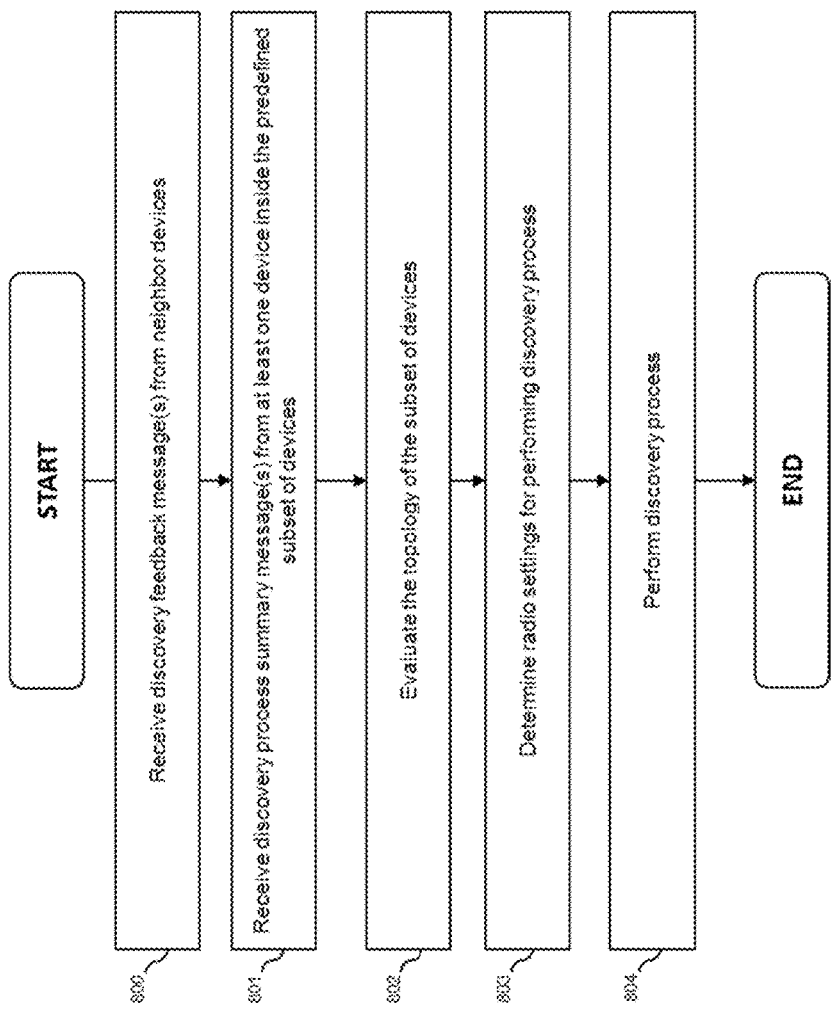

The method for performing a neighbour discovery is described, at a group of devices level with reference to the flowchart of FIG. 8.

During a first step 800, a network device receives, through its network interface module, one or several discovery feedback message(s) 1050 from one or several neighbour device(s), which are not currently part of the group of devices to which it belongs. The discovery feedback message(s) received are passed by the network interface module to the topology evaluation module for further group topology evaluation.

During a second step 801, a network device receives, through its network interface module, discovery process summary message(s) 1150 from other network devices inside the group of devices to which it belong, and/or discovery feedback message(s) from at least one device inside the predefined subset of devices. Any received discovery process summary message(s) 1050 is passed by the network interface module to the topology evaluation module for further group topology evaluation.

During a third step 802, the topology evaluation module of the network device compiles the information embedded in all the discovery feedback message(s) 1050 and discovery process summary message(s) 1150 it recently received. For example, this operation is performed on a regular basis, e.g. every 50 ms. Based on these information, the topology evaluation module builds a spatial topology of the new group of network devices, including the newly discovered neighbour devices (i.e. the network devices for which a discovery feedback message 1050 was received by at least one network device of the current group of devices)

Figure 9:
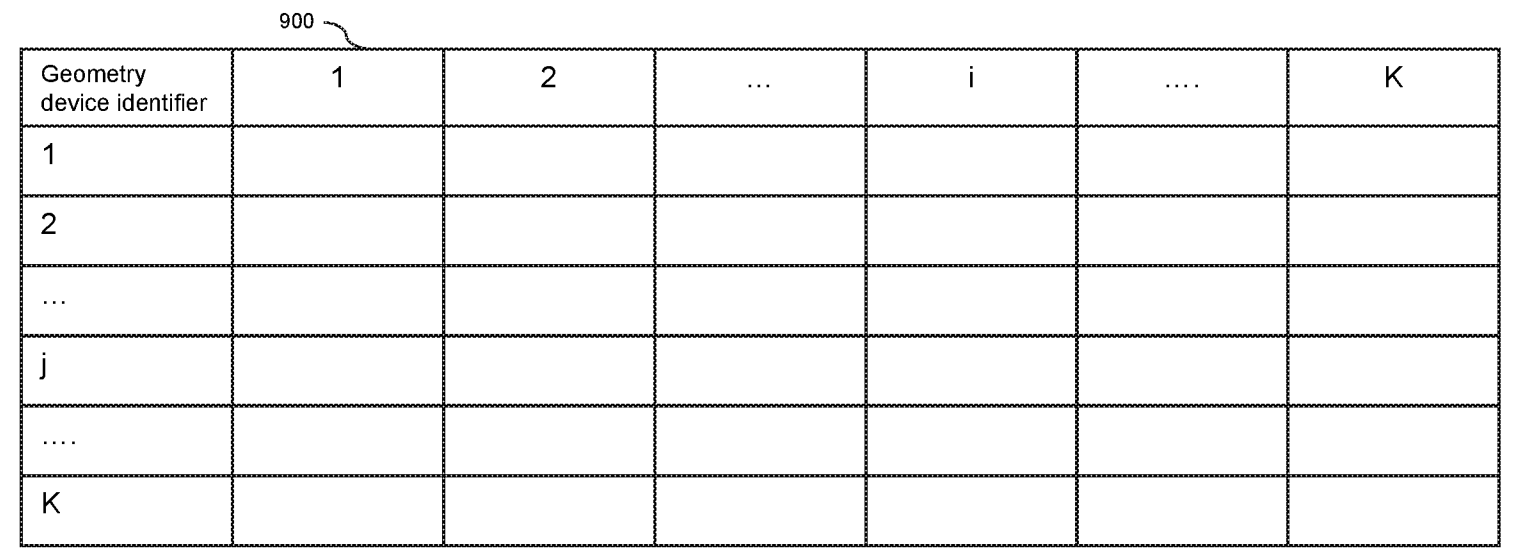

The description and the storage scheme of such spatial topology is described in what follows with reference to FIG. 9. The update of the group's spatial topology is performed by updating the spatial topology array 900 by adding new entries in this array for each of the newly discovered network devices.

Back to FIG. 8, after step 802, during a step 803, the newly computed spatial topology of the group of devices is used by the radio configuration module for defining new complementary (or coordinated) radio and antenna settings for each of the network devices of the updated group of devices. Some examples of complementary radio and antenna settings have already been given in FIG. 5.

Finally, during a step 804, the network interface module of the network device performs the discovery process, which is managed by the discovery management module, using the radio and antenna settings defined during step 802.

An application of the process described with reference to FIG. 8 is presented hereinafter in the context of an exemplary network 1300 represented in FIG. 13.

Network device 1312 of group 1350 receives (step 800) a discovery feedback message 1050 from network device 1322 which belongs to the single-device group 1360. It is thus considered that network device 1322 actually received a probe message 1000 that network device 1312 had previously sent.

Since no other device belonging to group 1350 has received a discovery feedback message 1050, network device 1312 did not receive any discovery process summary message during step 801. According to the process described with reference to FIG. 7, network device 1312 sent a discovery confirmation message 1100 to network device 1322 in response to the discovery feedback message 1050 it received from network device 1322.

Using the information embedded in the feedback message received from device 1322, the topology evaluation module of network device 1312 updates the spatial topology of group 1350 by including network device 1322 (step 802). The newly formed group is group 1380.

Using the information embedded in the confirmation message received from device 1312, the topology evaluation module of network device 1322 updates the spatial topology of group 1360 by including network devices 1311 and 1312 (step 802). The newly formed group is group 1380.

For example, only the device that issues a confirmation message computes the new topology of a newly formed group, and transmits the newly computed topology to the device that sent a feedback message.

Since network devices 1311 and 1312 were initially part of the same group 1350, they were using complementary radio and antenna settings, like, for instance antenna settings 532 for network device 1311 and antenna settings 531 for network device 1312. Also, network device 1322 was initially using antenna settings 551 for its communication module 1326 and antenna settings 552 for its communication module 1325.

Based on the topology of the newly formed group 580, the radio configuration modules of network devices 1311, 1312 and 1322 update the antenna settings to be applied by their respective communication modules. For instance, communication module 1317 of network device 1311 keeps using antenna setting 532. Communication module 1319 of network device 1312 may now use antenna settings 511. Communication module 1326 of network device 1322 may now use antenna settings 513. Communication module 1325 of network device 1322 may now use antenna settings 512.

Having the knowledge of the topology model of network 1300 can also allow a radio configuration module to determine particularly relevant antenna settings that can optimize network discovery. For instance, knowing that the topology model for network 1300 is a matrix topology allows network devices 1311 and 1322 knowing the presence of network device 1321 as a neighbour device located at 270° from network device 1311 and at 180° from network device 1322.

With reference to FIG. 9, there is described an exemplary mode of representation of the spatial topology of a wireless communication network.

A spatial topology may be represented by an array 900 of K rows and K columns, K being the number of communication devices in the network. This array may be referred to as a "spatial topology array". A non-empty element of the array located at the row i and the column j corresponds to the existence of a communication path between the device i and the device j. An empty element of the array means that there is no possible communication path in any directions between the two corresponding devices, i.e. the communication path between communication modules of the two corresponding devices Each element of the array refers to the transmit antenna parameters used by the respective communication modules of device i and device j, which allows identifying the communication path between said two devices i and j.

In what follows, the considered transmit antenna parameters are the antenna direction and the antenna transmit power. However, other or additional transmit antenna parameters may be used (e.g. transmit antenna gain).

The communication device identifier considered in a network topology array is referred to as the topology device identifier. It may be different from the typical network device identifier typically based on the MAC address of the device.

A network topology array is stored in the ROM for each device. The value of the parameters stored in this array may be filled directly by a user, through a dedicated user interface, or by programming the ROM device upon device manufacturing.

Figure 13:
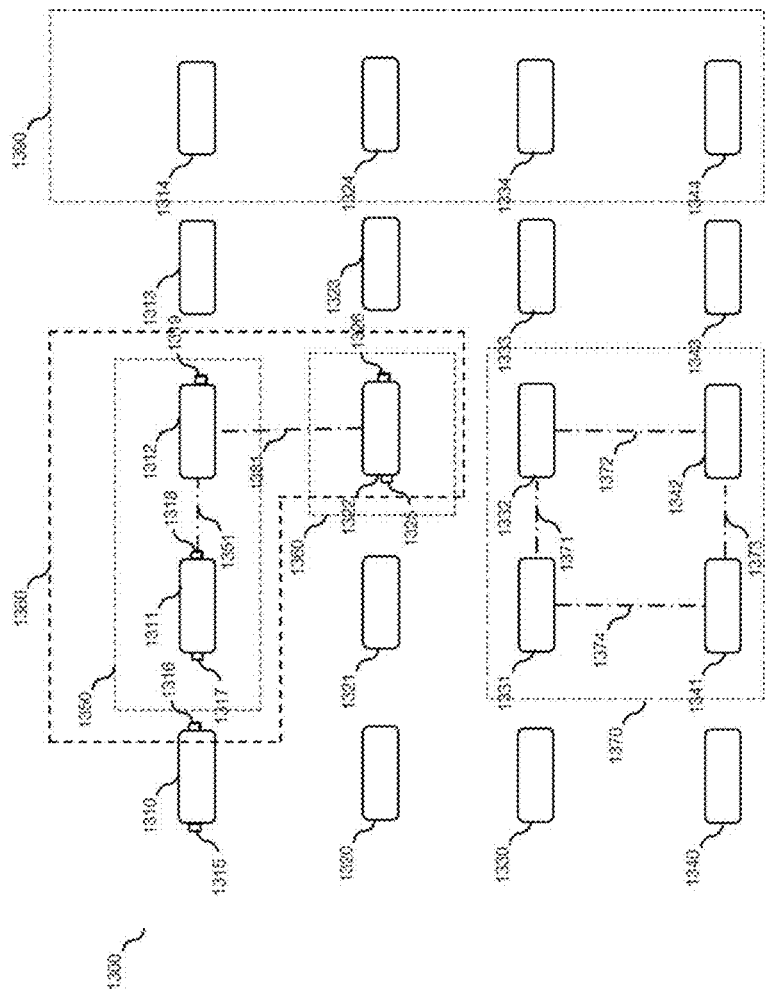
FIG. 13 depicts an exemplary multi-projection wireless communication network according to embodiments.

An example of network topology array based on the network topology of wireless communication network 1300 of FIG. 13 is given hereinbelow. For the sake of conciseness, the distances between the devices 1310, 1311, 1320 and 1321 are considered as identical and one same value of transmit power can be specified (for instance 0.01 W) as the transmit power to be used by each communication device in the network to perform communication with other communication neighbour devices during the discovery protocol described with reference to FIG. 7 and FIG. 8.

Therefore, the network topology array for devices 1310, 1311, 1320 and 1321 of network 1300 of FIG. 13 only gathers antenna direction information, as follows:

| Topology device identifier | 1 | 2 | 3 | 4 |
|---|---|---|---|---|
| 1 | X | $d_{12}/d_{21}$ | $d_{13}/d_{31}$ | X |
| 2 | $d_{21}/d_{12}$ | X | X | $d_{24}/d_{42}$ |
| 3 | $d_{31}/d_{13}$ | X | X | $d_{34}/d_{43}$ |
| 4 | X | $d_{42}/d_{24}$ | $d_{43}/d_{34}$ | X |

Topology device identifier "1" refers to device 1310;
Topology device identifier "2" refers to device 1311;
Topology device identifier "3" refers to device 1320;
Topology device identifier "4" refers to device 1321;

In the above array, $(d_{ij}/d_{ji})$ refers to the transmit antenna direction $d_{ij}$ (respectively $d_{ji}$) to be used by communication device i (respectively j) to communicate with communication device j (respectively i). Moreover, the combination $(d_{ij}/d_{ji})$ identifies the communication link $L_{ij}$ between two communication devices i and j.

For instance, communication device 1 shall set its transmit antenna configuration to a 0° direction in order to communicate with communication device 2, while communication device 2 shall set its transmit antenna configuration to a 180° direction in order to communicate with communication device 1. Therefore, $d_{12}$ value is 0° while $d_{21}$ value is 180°. Similarly, $d_{13}$ value is 270° while $d_{31}$ value is 90°; $d_{24}$ value is 270° while $d_{42}$ value is 90°; $d_{34}$ value is 0° while $d_{43}$ value is 180°.

Depending on the antenna configuration value specified in the network topology array, the communication device may select the appropriate communication module.

For instance, when considering communication device 1310, communication module 1315 shall handle communications in the directions ranging from 90° to 270°, while communication module 1316 shall handle communications in the directions ranging from 0° to 90° and from 270° to 360°.

Figure 10B:
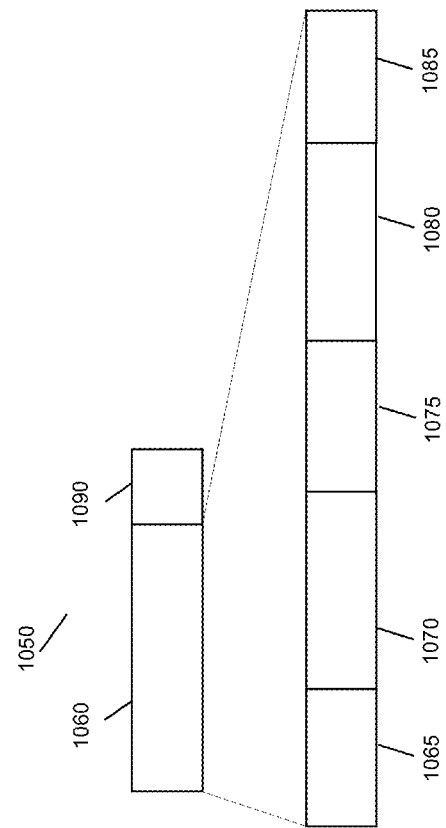
FIGS. 10a, 10b, 11a and 11b illustrate exemplary message formats exchanged during discovery processes according to embodiments.
Figure 10A:
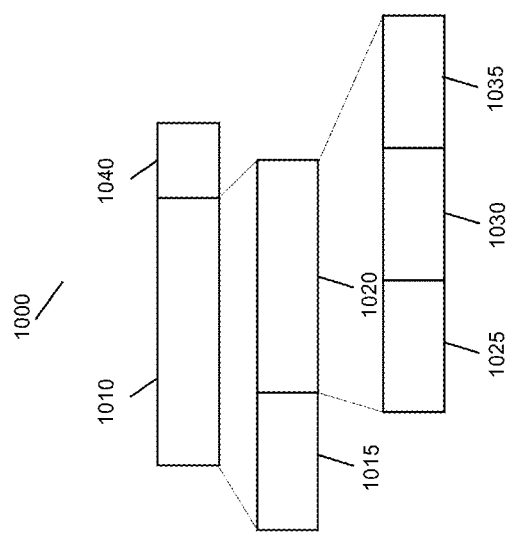

FIG. 10a, FIG. 10b and FIG. 11 illustrate the format of the messages sent during the discovery protocol process described with reference to FIG. 7 and FIG. 8 between two devices belonging to the wireless communication network.

FIG. 10a is an illustration of an exemplary probe message 1000.

Probe Message 1000 comprises a data field 1010 and a cyclic redundancy check (CRC) field 1040 for checking the validity of the data part 1010. Data field 1010 is made of two main information fields. Information field 1015 embeds the identifier of the communication device sending the probe message. The identifier of said communication device may be, for instance, the network device identifier—e.g. the MAC address of said communication device or a function of its MAC address—or a unique device identifier (e.g. serial number). Information field 1020 embeds the transmit antenna parameters used by the communication device for sending the probe message. Information field 1020 may embed a plurality of transmit parameters information, like, for instance, the antenna direction value (field 1025), expressed in degrees, the transmit power (field 1030), expressed in Watts, or the transmit antenna gain or the transmit antenna mode—i.e. directional or wide—(field 1035).

FIG. 10*b* is an illustration of an exemplary feedback message 1050.

Feedback Message 1050 depicted in FIG. 10*b* comprises a data field 1060 and a cyclic redundancy check (CRC) field 1090 for checking the validity of the data part 1060. Data field 1060 comprises a plurality of information fields. Information field 1065 embeds the identifier of the communication device sending the feedback message. The identifier of said communication device may be, for instance, the network device identifier—e.g. the MAC address of said communication device or a function of its MAC address—or a unique device identifier (e.g. serial number). Information field 1070 embeds the transmit antenna parameters used by the communication device for sending the feedback message. Information field 1070 may embed a plurality of transmit parameters information (as for field 1020 of probe message 1000) like for instance, the antenna direction value, expressed in degrees, the transmit power, expressed in Watts, or the transmit antenna gain or the transmit antenna mode—i.e. directional or wide. Information field 1075 embeds the identifier of the communication device that sent the probe message related to the feedback message being sent. Thus, field 1075 shall have the same value as field 1015 of the probe message 1000 associated to the feedback message 1050 being sent. Information field 1080 embeds the transmit antenna parameters used by the communication device that sent the probe message related to the feedback message being sent. Thus, information field 1080 shall have the same value as field 1020 of the probe message 1000 associated to the feedback message 1050 being sent. Information field 1080 may also embed (field 1085) information related to the topology of the cluster of devices to which the sender of the feedback message belongs. For example, the topology information may be set according to the topology description scheme described with reference to FIG. 9.

FIG. 11 is an illustration of an exemplary confirmation message 1100.

Confirmation message comprises a data field 1110 and a cyclic redundancy check (CRC) field 1120 used for checking the validity of the data part 1110. Data field 1110 comprises information fields 1111, 1112, 1113, 1114 and 1115. Information field 1111 embeds the identifier of the communication device sending the confirmation message. The identifier of said communication device may be, for instance, the network device identifier—e.g. the MAC address of said communication device or a function of its MAC address—or a unique device identifier (e.g. serial number). Information field 1112 embeds the transmit antenna parameters used by the communication device for sending the confirmation message.

Information field 1113 embeds the spatial topology of the group of devices to which the device issuing the confirmation message belongs. For example, spatial topology information 1114 may be set according to the topology description scheme described with reference to FIG. 9. Such spatial topology is determined as described with reference to FIG. 7 and FIG. 8.

Information field 1114 embeds an estimation of the spatial topology of the wireless communication network, like for instance network 100, 200 or 1300, to which the device issuing the confirmation message belongs. For example, spatial topology information 1114 may be set according to the topology description scheme described with reference to FIG. 9. Such spatial topology estimation is performed as described with reference to FIG. 7 and FIG. 8.

Figure 11B:
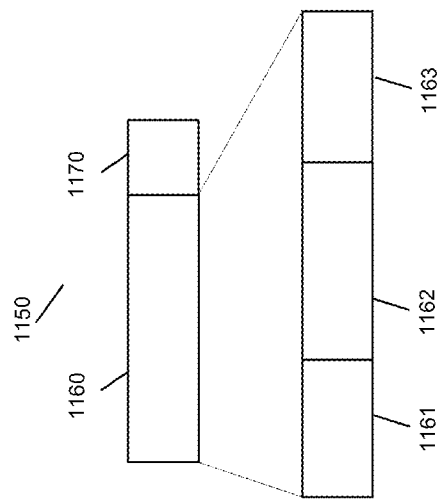

FIG. 11*b* illustrates an exemplary format for the discovery process summary messages sent during the discovery protocol process described with reference to FIG. 7 and FIG. 8 between two devices belonging to a same group of devices (i.e. devices that already discovered each other).

Figure 11A:
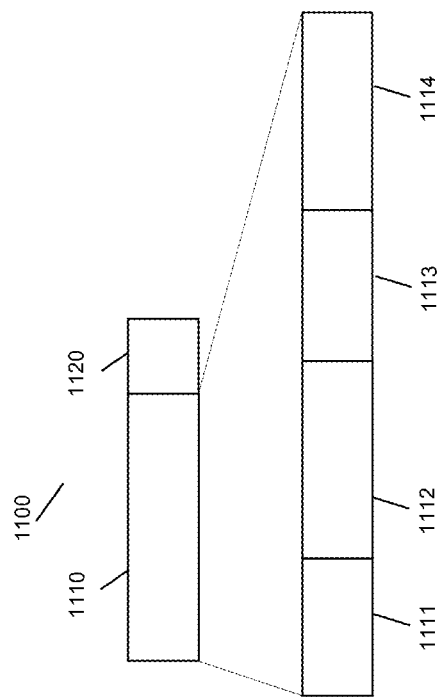

The discovery process summary message 1150 illustrated in FIG. 11*a* comprises a data field 1160 and a cyclic redundancy check (CRC) field 1170 for checking the validity of the data part 1160. Data field 1160 comprises information fields 1161, 1162 and 1163. Information field 1163 embeds the data fields 1060 related to each of the discovery feedback message 1050 received from newly discovered network devices. The number of data fields 1060 embedded inside information field 1162 is provided in information field 1162. Information field 1161 embeds the identifier of the communication device sending the discovery process summary message. The identifier of said communication device may be, for instance, the network device identifier—e.g. the MAC address of said communication device or a function of its MAC address—or a unique device identifier (e.g. serial number).

For example, information field 1163 embeds the data fields 1060 related to each of the discovery feedback messages 1050 received from newly discovered network devices along with data fields 1163 related to each of the discovery process summary messages 1150 received from formerly discovered network devices.

With reference to FIG. 12, there is described a wireless medium access scheme for performing a discovery protocol according to embodiments.

The communication modules of a given communication device, like for instance communication device 110 of wireless communication network 100, when performing a discovery protocol (e.g. as described with reference to FIG. 7 and FIG. 8), alternate between transmission periods, like time periods 1201, 1203, 1205, 1211 and 1213, and reception periods, like time periods 1202, 1204 and 1212.

For a given communication device, the duration for both the transmission and the reception periods is chosen randomly. Moreover, when one communication module of a given communication device is in transmission mode the other communication module is in reception mode.

Embodiments of the present invention may have applications in multi-projections systems.

FIG. 13 is an illustration of a multi-projection system 1300 comprising multiple projection display apparatus 1310, 1311, 1312, 1313, 1314, 1320, 1321, 1322, 1323, 1324, 1330, 1331, 1332, 1333, 1334, 1340, 1341, 1342, 1343 and 1344 for projecting on a screen, video frames delivered by a source device connected to one or more of these apparatuses.

A projection display apparatus is typically a video projector that projects a video stream but may encompass any type of projector such as for example a still image projector.

Each of these display apparatuses 1310, 1311, 1312, 1313, 1314, 1320, 1321, 1322, 1323, 1324, 1330, 1331, 1332, 1333, 1334, 1340, 1341, 1342, 1343 and 1344 embeds at least one communication module, which includes at least one antenna, as described with reference to FIG. 3. For example, each of the display apparatuses 1310, 1311, 1312, 1313, 1314, 1320, 1321, 1322, 1323, 1324, 1330, 1331, 1332, 1333, 1334, 1340, 1341, 1342, 1343 and 1344 embeds two communication modules. For instance, display apparatus 1310 embeds communication modules 1315 and 1316 while display apparatus 1311 embeds communication modules 1317 and 1318.

According an exemplary implementation, the communication network 1300 is a full wireless communication network, i.e. all the communication links are wireless. For example, this wireless communication network is operated in the 57-66 GHz millimeter-wave unlicensed spectrum, which provides bandwidth required for the transport of high definition (HD) video data.

Alternatively, some of the inter-projectors communication paths are wireless communication paths.

An image to be projected is split into a plurality of sub-images. The number of sub-images per image is typically, but not necessarily, equal to the number of projectors in the multi-projection system. The size and shape of each sub-image is determined so that a full composite image can be reconstructed when all the sub-images are projected by their corresponding projectors.

In what follows, there is described a method for adjusting the transmit frequency of the probe messages. The method may accelerate the discovery process.

The number of probe messages 1000 sent during a given time period is referred to as the frequency F. When considering a TDMA medium access scheme, like the one described with reference to FIG. 12, several consecutives time slots are defined, the size of which may differ, wherein a node is either in emission or in reception mode.

It is considered that the communication mode—i.e. emission or reception—to be used in a given time slot is set according to a random scheduler.

The probability that a node i transmits during the time slot l is denoted p(l,i).

During a given time slot, a node can send a given number M of probe messages 1000. Consequently, there is a direct relation between the aforementioned mean frequency F and p(l,i) whereby:

$$F = \frac{p(l, i) \times M}{\text{Slot\_duration}}$$

Since all the nodes in the network are equivalent, it may be of particular interest to determine the value of p(l,i) that optimizes the probability $p_{i,j}$ that a node i discovers a node j, so as to allow faster discovery process.

Each network node embeds at least one directional antenna. Each antenna is steerable and each antenna can be used either in transmission or reception.

When considering a transmission time slot, let θ the area covered by the antennas belonging to a given network node, θ being comprised between 0 and a coverage area CA (for instance 2π at the beginning). CA is the discovery space representing the angle range over which probe messages 1000 are sent. The area θ can be a sum of $θ_i$ wherein $θ_i$ is the beam width of a directional antenna:

$$\theta = \sum_{n=1}^{N} \theta_n$$

When considering a reception time slot, the receive antenna configuration mode is wide, so as to maximize the probability of reception of the discovery messages.

The probability that a node j transmits in the range of the node i is:

$$\frac{\theta}{CAi}$$

Where CAi is the coverage area of the node i.

Depending on the actual network topology, a network node may be surrounded by a plurality of network nodes, which may differ from one topology to another. Therefore, an estimated neighbor density K is defined, which indicates for each node, the number of nodes that are in its reception range.

A node i discovers a node j if:
1) Node i is in reception mode, and
2) Only one node j in the neighborhood of node i (the density of which is $K_i$), transmits towards node i—i.e. if two nodes transmit simultaneously a probe message 1000 towards node i, node i cannot discover any of these two nodes.

Document Vasudevan et al. "*On neighbor discovery in wireless networks with directional antennas*" is a study of the neighbor discovery problem in static wireless ad hoc networks with directional antennas. This document discloses several probabilistic algorithms and the following formula for expressing the probability $p_{i,j}$ that one node i discovers a node j:

$$p_{i,j} = \frac{\theta}{2\pi} p_t \left(1 - \frac{\theta}{2\pi} p_t\right)^{k-2} (1 - p_t)$$

Based on the aforementioned considerations, we can derive from the above formula the following one:

$$p_{i,j} = (1 - p(l, i)) \frac{\theta}{CAi} p(l, i) \left(1 - \frac{\theta}{CAi} p(l, i)\right)^{k_i - 2}$$

Where:
(1−p(l,i)) is the probability that the node i is in reception mode during the slot l, $$\frac{\theta}{CAi}$$

is the probability mat a node j transmits in the range of the node i, p(l, i) is the probability that a node j transmits during the time slot l and $$\left(1 - \frac{\theta}{CAi} p(l, i)\right)^{k_i - 2}$$

is the probability that the other node nodes (excepted i and j) do not transmit in the range of the node i Finally, the probability that node i discovers node j within t time slots is:

$P_{i,j}(t) = 1-(1-p_{i,j})^t$

The objective is then to find p(l,i) that optimizes $P_{i,j}$.

The probability p(l,i) that a node j transmits in the range of the node i, which optimizes $P_{i,j}$ is equal to:

$$p_{(l,i)} = \frac{\left(2+(K_i-1)\frac{\theta}{CA_i}\right) - \sqrt{\left(2+(K_i-1)\frac{\theta}{CA_i}\right) - 4K_i\frac{\theta}{CA_i}}}{K_i\frac{\theta}{CA_i}}$$

With $K_i$ being the number of nodes in the reception range of node i.

The optimal (l,) can be computed but the problem is not resolved because $K_i$ is not known. Only estimation of $K_i$ can be used.

With $KT_i$ being the true value of $K_i$ corresponding to the actual number of nodes in the reception range of node i:

If $K_i > KT_i$, the transmission probability is underestimated and consequently, the channel is under-utilized and some discovery events are missed.

If $K_i < KT_i$, the transmission probability is overestimated and consequently, more collisions are generated.

The algorithm described with reference to FIG. 8 makes it possible to adjust the value of the coverage area CA each time the radio settings are determined for performing further discovery process (step 803 of the algorithm). For instance, adjusting the antenna configuration of a given node i from configuration 531 to configuration 511 (see FIG. 5) makes it possible to restrict the coverage area from 180° to 90°. The adjustment of the coverage area $CA_i$ allows performing a new estimation of the number of nodes $K_i$ related to this new coverage area.

Therefore, the probability that a node j transmits in the range of the node i during the slot l is defined as follows:

$$p_{(l,i)} = \frac{\left(2+(K_i-1)\frac{\theta}{CA_i}\right) - \sqrt{\left(2+(K_i-1)\frac{\theta}{CA_i}\right) - 4K_i\frac{\theta}{CA_i}}}{K_i\frac{\theta}{CA_i}}$$

Then:

$$p_{(l,i)} = \frac{\left(2+(K_i(l)-1)\frac{\theta}{CA_i(l)}\right) - \sqrt{\left(2+(K_i(l)-1)\frac{\theta}{CA_i(l)}\right) - 4K_i(l)\frac{\theta}{CA_i(l)}}}{K_i(l)\frac{\theta}{CA_i(l)}}$$

The coverage area is modified according to the discovered neighbors. Consequently, the value of $K_i$—i.e. the number of nodes in the reception range of node i—is also modified. One may, for instance, consider a linear model for adjusting the value of $K_i$:

$$K_i(l) = K_i(l-1) * \frac{CA_i(l)}{CA_i(l-1)}$$

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method of node discovery in a self-organizing network, the method comprising the following steps:
performing a first discovery process for discovering spatial topology of a first group of nodes, the first group of nodes comprising at least a first node and a second node of the network, using at least one first wireless communication parameter comprising at least one antenna parameter,
evaluating the discovered spatial topology of the first group of nodes,
adapting said at least one first wireless communication parameter based on the evaluated spatial topology, thereby obtaining at least one second wireless communication parameter coordinated with wireless communication parameters of nodes of the first group of nodes, the at least one second wireless communication parameter comprising at least one antenna parameter; and
performing a second discovery process for discovering spatial topology of at least a third node of the network, not belonging to the first group of nodes, using said at least one second wireless communication parameter; and
wherein said adaptation step is performed in view of performing said second discovery process according to a respective discovery direction corresponding to a subdivision of a node discovery space.

2. The method according to claim 1, further comprising transmitting said evaluated spatial topology to at least one node of the first group.

3. The method according to claim 1, wherein said spatial topology is evaluated at least based on a topology message received from at least one node of the first group.

4. The method according to claim 3, wherein said topology message comprises information relating to a spatial topology of a second group of nodes to which the at least third node formerly belonged.

5. The method according to claim 1, wherein evaluating said spatial topology comprises updating a spatial topology array representative of a current spatial topology of the first group of nodes.

6. The method according to claim 5, wherein said spatial topology array is further representative of communication paths between nodes of the first group of nodes.

7. The method according to claim 1, wherein said node discovery space is subdivided into discovery directions and each node of said first group of nodes performs a respective discovery process according to a respective discovery direction.

8. The method according to claim 1, wherein said subdivision is an angular subdivision.

9. The method according to claim 1, wherein:
said performing of a first discovery process comprises emitting a probe message and receiving, from at least one node of the first group of nodes, a discovery message in response to said probe message, and
the method further comprises transmitting, to said at least one node of the first group of nodes of the network, a confirmation message.

10. A method of image data projection, by a multi-projection system, comprising the following steps:
discovering projection nodes of a network of the multi-projection system by:
performing a first discovery process for discovering spatial topology of a first group of nodes, the first group of nodes comprising at least a first node and a second node of the network, using at least one first wireless communication parameter comprising at least one antenna parameter,
evaluating the discovered spatial topology of the first group of nodes,
adapting said at least one first wireless communication parameter based on the evaluated spatial topology, thereby obtaining at least one second wireless communication parameter coordinated with wireless communication parameters of nodes of the first group of nodes, the at least one second wireless communication parameter comprising at least one antenna parameter; and
performing a second discovery process for discovering spatial topology of at least a third node of the network, not belonging to the first group of nodes, using said at least one second wireless communication parameter; and
wherein said adaptation step is performed in view of performing said second discovery process according to a respective discovery direction corresponding to a subdivision of a node discovery space,
subdividing at least one image according to projection nodes discovered, and
projecting respective image subdivisions by said projection nodes discovered.

11. A non-transitory medium storing a computer program, for implementing the method according to claim 1, when the program is loaded and executed by a computer or microprocessor.

12. A node device for performing node discovery in a self-organizing network comprising a processing unit configured to:
perform a first discovery process for discovering spatial topology of a first group of nodes, the first group of nodes comprising at least a first node and a second node of the network, using at least one first wireless communication parameter comprising at least one antenna parameter,
evaluate the discovered spatial topology of the first group of nodes, to adapt said at least one first wireless communication parameter based on the evaluated spatial topology, thereby obtaining at least one second wireless communication parameter coordinated with wireless communication parameters of nodes of the first group, the at least one second wireless communication parameter comprising at least one antenna parameter; and
perform a second discovery process for discovering spatial topology at least a third node of the network, not belonging to the first group of nodes, using said at least one second wireless communication parameter, and
wherein said adaptation is performed in view of performing said second discovery process according to a respective discovery direction corresponding to a subdivision of a node discovery space.

13. The node device according to claim 12, wherein said processing unit is further configured to transmit said evaluated spatial topology to at least one node of the first group.

14. The node device according to claim 12, wherein said spatial topology is evaluated at least based on a topology message received from at least one node of the first group.

15. The node device according to claim 14, wherein said topology message comprises information relating to a spatial topology of a second group of nodes to which the at least third node formerly belonged.

16. The node device according to claim 12, wherein evaluating said spatial topology comprises updating a spatial topology array representative of a current spatial topology of the first group of nodes.

17. The node device according to claim 16, wherein said spatial topology array is further representative of communication paths between nodes of the first group of nodes.

18. The node device according to claim 12, wherein said node discovery space is subdivided into discovery directions and each node of said first group of nodes performs a respective discovery process according to a respective discovery direction.

19. The node device according to claim 12, wherein said subdivision is an angular subdivision.

20. The node device according to claim 12, wherein:
said performing of a first discovery process comprises emitting a probe message and receiving, from at least one node of the first group of nodes, a discovery message in response to said probe message, and
the processing unit is further configured to transmit, to said at least one node of the first group of nodes of the network, a confirmation message.

21. A multi-projection system, for projection of image data, comprising a plurality of projection nodes configured to implement a method of image data projection, by a multi-projection system, comprising the following steps:
discovering projection nodes of a network of the multi-projection system by:
performing a first discovery process for discovering spatial topology of a first group of nodes, the first group of nodes comprising at least a first node and a second node of the network, using at least one first wireless communication parameter comprising at least one antenna parameter,
evaluating the discovered spatial topology of the first group of nodes,
adapting said at least one first wireless communication parameter based on the evaluated spatial topology, thereby obtaining at least one second wireless communication parameter coordinated with wireless communication parameters of nodes of the first group of nodes, the at least one second wireless communication parameter comprising at least one antenna parameter; and
performing a second discovery process for discovering spatial topology of at least a third node of the network, not belonging to the first group of nodes, using said at least one second wireless communication parameter; and
wherein said adaptation step is performed in view of performing said second discovery process according to a respective discovery direction corresponding to a subdivision of a node discovery space, subdividing at least one image according to projection nodes discovered, and projecting respective image subdivisions by said projection nodes discovered;

wherein said projection nodes are further configured to subdivide at least one image according to projection nodes discovered, and wherein the projection nodes discovered are further configured to project respective image subdivisions.

\* \* \* \* \*